United States Patent [19]
Carey et al.

[11] Patent Number: 5,856,858
[45] Date of Patent: Jan. 5, 1999

[54] PLASTIC SUBSTRATES FOR ACTIVE MATRIX LIQUID CRYSTAL DISPLAY INCAPABLE OF WITHSTANDING PROCESSING TEMPERATURE OF OVER 200° C AND METHOD OF FABRICATION

[75] Inventors: Paul G. Carey, Mountain View; Patrick M. Smith, San Ramon; John Havens, San Diego, all of Calif.; Phil Jones, Marlborough, United Kingdom

[73] Assignee: The Regents of the University of California, Oakland, Calif.

[21] Appl. No.: 980,837

[22] Filed: Dec. 1, 1997

[51] Int. Cl.$^6$ .................................................. G02F 1/133
[52] U.S. Cl. ................................ 349/158; 349/86; 349/92
[58] Field of Search ................................ 349/158, 86, 92

[56] References Cited

U.S. PATENT DOCUMENTS

| | | | |
|---|---|---|---|
| 4,561,724 | 12/1985 | Otaki et al. | 349/158 |
| 5,303,072 | 4/1994 | Takeda et al. | 359/59 |
| 5,477,351 | 12/1995 | Takahara et al. | 349/86 |
| 5,523,587 | 6/1996 | Kwo | 349/138 |
| 5,559,615 | 9/1996 | Takei et al. | 357/50 |
| 5,579,139 | 11/1996 | Abileah et al. | 349/117 |
| 5,623,280 | 4/1997 | Akins et al. | 349/12 |
| 5,637,359 | 6/1997 | Fukuchi et al. | 349/158 |
| 5,734,454 | 3/1998 | Omae et al. | 349/86 |

*Primary Examiner*—William L. Sikes
*Assistant Examiner*—Tarifur R. Chondhury
*Attorney, Agent, or Firm*—L. E. Carnahan

[57] ABSTRACT

Bright-polarizer-free, active-matrix liquid crystal displays (AMLCDs) are formed on plastic substrates. The primary components of the display are a pixel circuit fabricated on one plastic substrate, an intervening liquid-crystal material, and a counter electrode on a second plastic substrate. The-pixel circuit contains one or more thin-film transistors (TFTs) and either a transparent or reflective pixel electrode manufactured at sufficiently low temperatures to avoid damage to the plastic substrate. Fabrication of the TFTs can be carried out at temperatures less than 100° C. The liquid crystal material is a commercially made nematic curvilinear aligned phase (NCAP) film. The counter electrode is comprised of a plastic substrate coated with a transparent conductor, such as indium-doped tin oxide (ITO). By coupling the active matrix with NCAP, a high-information content can be provided in a bright, fully plastic package. Applications include any low cost portable electronics containing flat displays where ruggedization of the display is desired.

19 Claims, 7 Drawing Sheets

PLASTIC SUBSTRATES FOR ACTIVE MATRIX LIQUID CRYSTAL DISPLAY INCAPABLE OF WITHSTANDING PROCESSING TEMPERATURE OF OVER 200° C AND METHOD OF FABRICATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to flat panel displays, particularly to flat panel displays using liquid-crystal materials, and more particularly to pixel elements for flat panels displays utilizing active matrix pixel circuits, mematic curvilinear aligned phase films, and counter electrodes laminated together, and method of fabricating such pixel elements.

Conventional processing techniques used to fabricate active matrix liquid crystal displays (AMLCDs) require processing temperatures of at least 300°–350° C. Temperatures in this range are too high for most plastic substrates, and presently all AMLCDs are fabricated on substrates made of silicon, quartz, or glass. These substrates are inherently brittle and often break, providing the most common failure mechanism seen for portable electronic systems.

Recently a very low temperature ($\leq 100°$ C.) process has been developed to fabricate active matrix pixel circuits on plastic substrates, as described and claimed in copending U.S. application Ser. No. 08/940,104, filed Sep. 29, 1997, entitled "Display Pixels Driven By Silicon Thin Film Transistors And Method Of Fabrication".

Polymeric liquid crystal material, such as nematic curvilinear aligned phase (NCAP) films developed by Raychem Corporation, also known as polymer dispersed liquid crystal (PDLC), are particularly amenable to large-area displays with plastic substrates and have been marketed commercially for years in such applications. Because the NCAP emulsion can be coated directly onto a continuous plastic web and the water dried off to form a uniform film it has been found that the NCAP material itself may provide a uniform spacing between electrodes, with no spacer beads or cell filling necessary.

A major hurdle for applications of the NCAP films to date has been the necessity to drive each pixel directly. The electro-optical response curve of transmission versus voltage is not sufficiently steep for NCAP materials to allow use of the same sort of multiplexing schemes possible for twisted nematic (TN) or supertwisted nematic (STN) displays. Furthermore, the NCAP materials are not typically bistable, which can allow other means of multiplexing.

The present invention combines the silicon thin-film transistor (Si-TFT) on plastic based pixel fabrication, of the above-referenced copending application, with Raychem Corporation's NCAP polymeric liquid crystal material to fabricate lightweight, rugged, and flexible pixel elements for AMLCDs.

SUMMARY OF THE INVENTION

It is an object of the invention to provide pixel elements for active matrix liquid crystal displays on plastic substrates.

A further object of the invention is to provide bright, polarizer-free, active-matrix liquid crystal displays on plastic substrates.

A further object of the invention is to provide a method for the formation of pixel elements for active matrix liquid crystal displays on plastic substrates.

Another object of the invention is to combine a silicon thin-film transistor on plastic based pixel fabrication with nematic curvilinear aligned phase (NCAP) polymeric liquid crystal material to fabricate pixel elements for lightweight, rugged, and flexible active-matrix liquid crystal displays.

Another object of the invention is to provide a flexible active-matrix liquid crystal display having pixel elements which are composed of three basic components including a pixel circuit, an intervening film of liquid-crystal material, and a counter electrode.

Another object of the invention is to provide pixel elements for a flexible active-matrix liquid crystal display utilizing a film of nematic curvilinear aligned phase material laminated between a pixel circuit fabricated on a low-temperature plastic substrate and a counter electrode.

Other objects and advantages of the present invention will become apparent from the following description and accompanying drawings. Basically the invention involves pixel elements for an active matrix liquid crystal display on a plastic substrate and methods for fabrication. The invention combines pixel circuits using silicon thin-film transistors on plastic substrates and a polymeric liquid crystal material to produce a lightweight, rugged, and flexible active-matrix liquid crystal display. The liquid crystal material is a nematic curvilinear aligned phase (NCAP) film wherein contrast is generated by light scattering and dye absorption rather than through the use of crossed polarizers. The pixel elements of the display are composed of three components, a pixel circuit fabricated on a plastic substrate, an intervening NCAP film, and a counter electrode on a second plastic substrate. The pixel circuit contains one or more thin-film transistors (TFTs) and either a transparent or reflective pixel electrode fabricated at sufficiently low temperatures to avoid damage to the plastic substrate. Fabrication temperatures of less than 100° C. have been used with a substrate of polyethyleneterephthalate (PET), for example. The counter electrode may be composed of a plastic substrate coated with a transparent conductor, such as indium-doped tin oxide (ITO). The main advantage of coupling the active matrix pixel with NCAP is that high-information content can be provided in a bright, fully plastic package.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
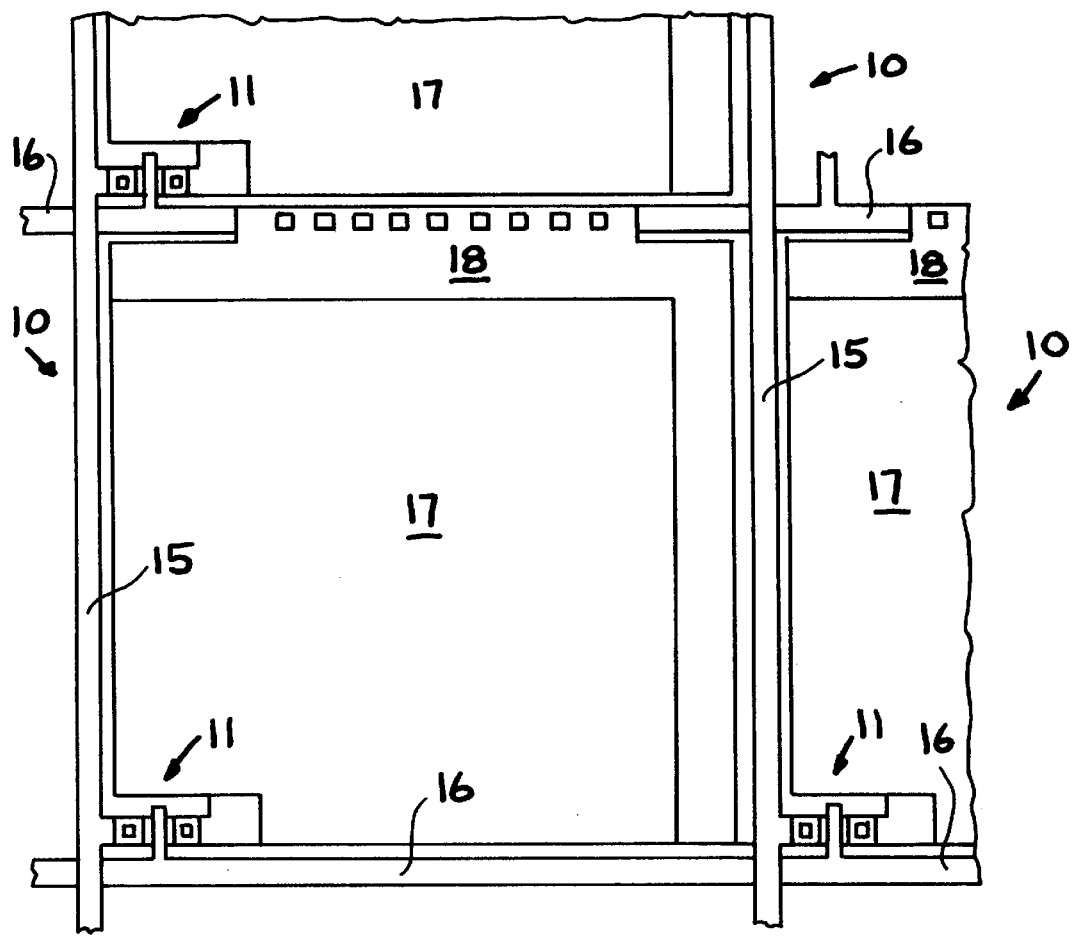
FIG. 1 is a schematic top view of a plurality of pixel circuits for use in an active matrix display using liquid crystal material.

The present invention is directed to pixel elements for a flexible, bright, polarizer-free, active-matrix liquid crystal display (AMLCD) on plastic substrates. The AMLCD of this invention contains pixel elements forming a laminated structure composed of an active matrix pixel circuit, a film of polymeric liquid crystal material, and a counter electrode. Both the pixel circuit and the counter electrode utilize low-temperature plastic substrates, with the pixel circuit including a thin-film transistor (TFT) and a storage capacitor. The TFT is constructed such that the gate electrode is connected to the scan line of the pixel, the drain electrode is connected to the data line of the pixel, and the source electrode is connected to a pixel electrode. The pixel electrode can be coated with indium-doped tin oxide (ITO) or with a reflective metal, such as aluminum. The film of polymeric liquid crystal material may be commercially available material such as in a nematic curvilinear aligned phase (NCAP) containing film manufactured by Raychem Corporation. The counter electrode may be composed of a polymer (plastic) substrate coated with ITO. The individual flexible AMLCD pixel elements can be fabricated or arranged in an array to make an AMLCD. The pixel elements can be made with row and column connections for an array of pixels wherein the gate electrodes of the TFTs are connected together in rows, and the drain electrodes of the TFTs are connected together in columns. The source electrode of each pixel TFT is connected to its pixel electrode, and is electrically isolated from every other circuit element in the pixel array.

Other flexible or rigid plastic substrate materials may be used as the substrate material. While polyethyleneterephthalate (PET) has been utilized as the substrate material in experimental verification at very low temperatures ($\leq 100°$ C.), other appropriate plastic substrates can be used, such as polyethylenenapthalate (PEN), polycarbonate (PC), polyarylate (PAR), polyetherimide (PEI), polyethersulphone (PES), polyimide (PI), Teflon poly(perfluoro-alboxy) fluoropolymer (PFA), poly(ether ether ketone) (PEEK), poly (ether ketone) (PEK), poly(ethylene tetrafluoroethylene) fluoropolymer (PETFE), and poly(methyl methacrylate) and various acrylate/methacrylate copolymers (PMMA). Certain of these plastic substrates can withstand higher processing temperatures of up to at least about 200° C. (some to 300°–350° C.) without damage.

Depending on the application, opaque, reflecting, or translucent conductors can be used for the pixel electrode for direct view or projection displays, and may be subsequently processed to enhance the reflective or transmissive optical properties of the pixel. Other transparent conductors, such as zinc oxide, may be used in place of ITO for the pixel electrode as well as the counter electrode. Reflective AMLCDs can be made using aluminum or some other metal as the pixel electrode. The aluminum can be either included in the interconnect metal step or at the end of the process as its own layer. If it is at the end of the process, it can be placed over as much as 95% of the total pixel area (including directly over the TFT) to increase the aperture area of the pixel.

Figure 10:
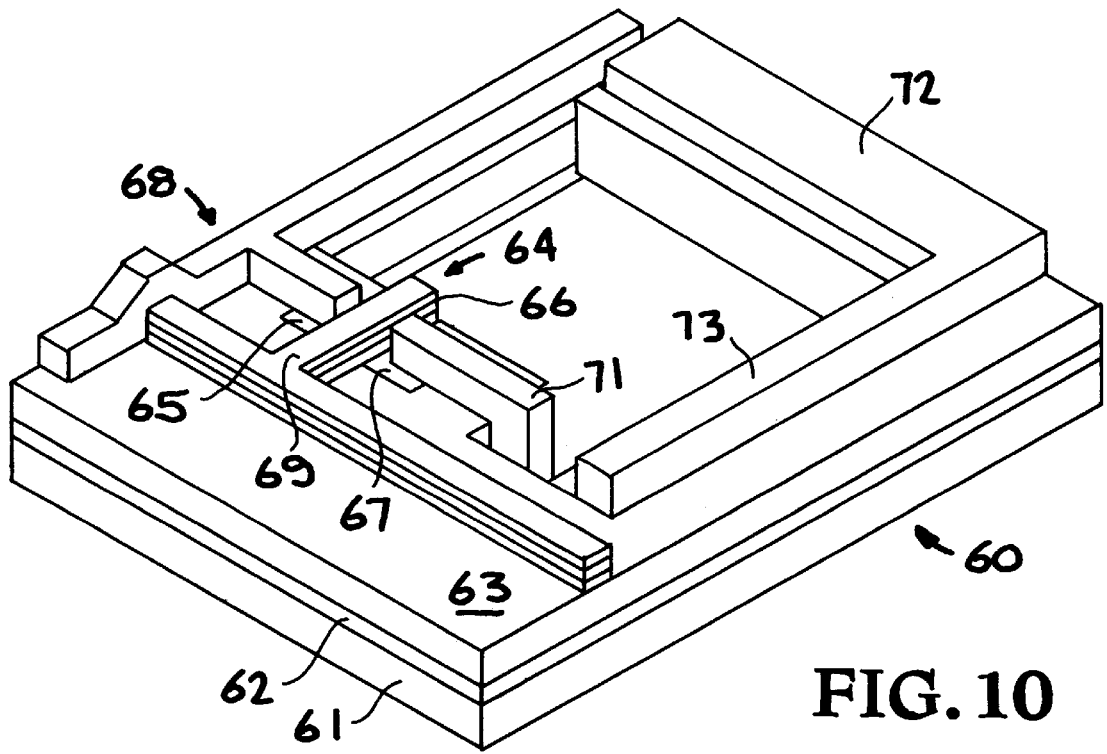
FIG. 10 is a three-dimensional illustration of another embodiment of a pixel circuit.

This invention combines the silicon thin-film transistor (SiTFT) on plastic based pixel fabrication process of above-referenced application Ser. No. 08/940,104 with Raychem Corporation's commercially available NCAP polymeric liquid crystal material and with a counter electrode to fabricate laminated lightweight, rugged, and flexible pixel elements for an AMLCD. An embodiment of a layout of a pixel element in an active matrix display is shown in FIG. 10, for example. The process for fabricating the SiTFT on low-temperature substrates is described and claimed in copending U.S. application Ser. No. 08/611,318, filed Mar. 5, 1996, entitled "Method For Formation Of Thin Film Transistors On Plastic Substrates", and the process for fabricating the SiTFT and an adjoining pixel electrode at very low temperatures ($\leq 100°$ C.) on polyethyleneterephthalate (PET), for example, is described and claimed in above-referenced application Ser. No. 08/940,104, which are herein incorporated by reference. The pixel elements can contain one or more amorphous or polycrystalline channel silicon thin-film transistors that are connected to a large pixel electrode. The TFTs are addressed by external drive electronics either fabricated directly on the same substrate as the pixels, or fabricated on higher temperature substrates (such as silicon wafers) and connected to AMLCD pixel elements with flexible interconnects. The pixel electrodes can be made from either a transparent conducting material such as ITO to make a transmissive display which reflects light off of a reflector located in back of the pixel electronics, or from a metal such as aluminum to create a reflective display where the reflector is above the pixel electronics.

The liquid crystal material composed of nematic curvilinear aligned phase (NCAP) films is particularly amenable to large-area displays with plastic substrates. Because the NCAP emulsion can be coated directly onto a continuous plastic web and the water dried off to form a uniform film, the NCAP material itself provides a uniform spacing between the pixel circuit and the counter electrode. No spacer beads or cell filling is necessary, and the entire manufacturing process can be performed in a straight-forward fashion. Contrast in the NCAP material is generated by light scattering and dye absorption, rather than through the use of crossed polarizers. Because of the lack of polarizers, NCAP displays can be bright in the "on" state and can be used with or without pleochroic dyes to aid hiding power in the "off" state. As pointed out above, the major hurdle for applications of the NCAP films to date has been the necessity to drive each pixel directly. The electro-optical response curve of transmission versus voltage is not sufficiently steep for NCAP materials to allow use of the same sort of multiplexing schemes possible for twisted nematic (TN) or supertwisted nematic (STN) displays. Furthermore, the NCAP materials are not typically bistable, which can allow other means of multiplexing. The use of an active matrix of TFTs on plastic allows this multiplexing limitation to be overcome and thus provides a route to flexible, plastic, bright displays with high information content.

Figure 11:
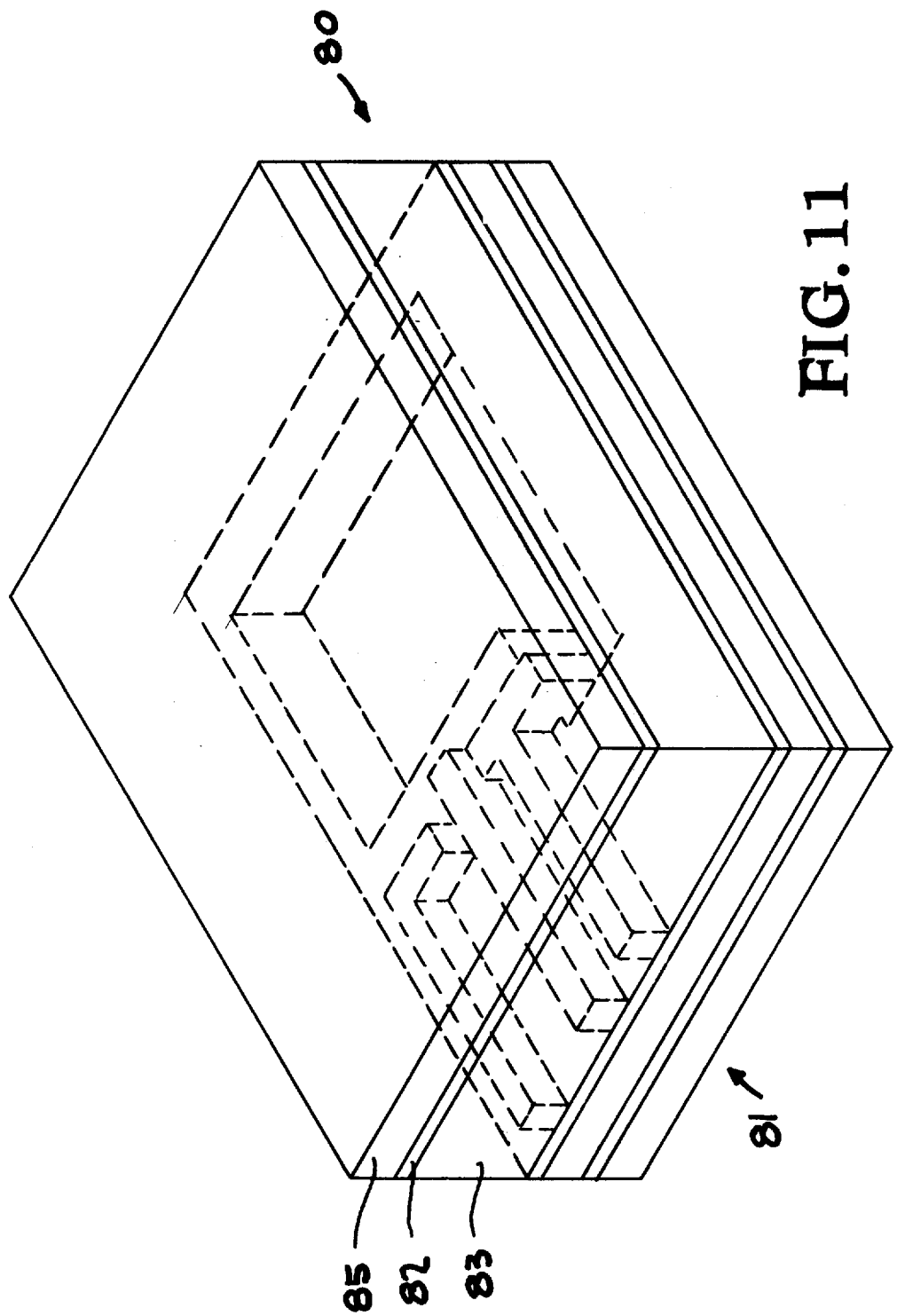
FIG. 11 is a top perspective view of a laminated pixel element showing the pixel circuit arrangement of FIG. 9, a film of polymeric liquid crystal material, and a counter electrode laminated together to form a flexible active-matrix liquid crystal display pixel element in accordance with the present invention.
Figure 12:
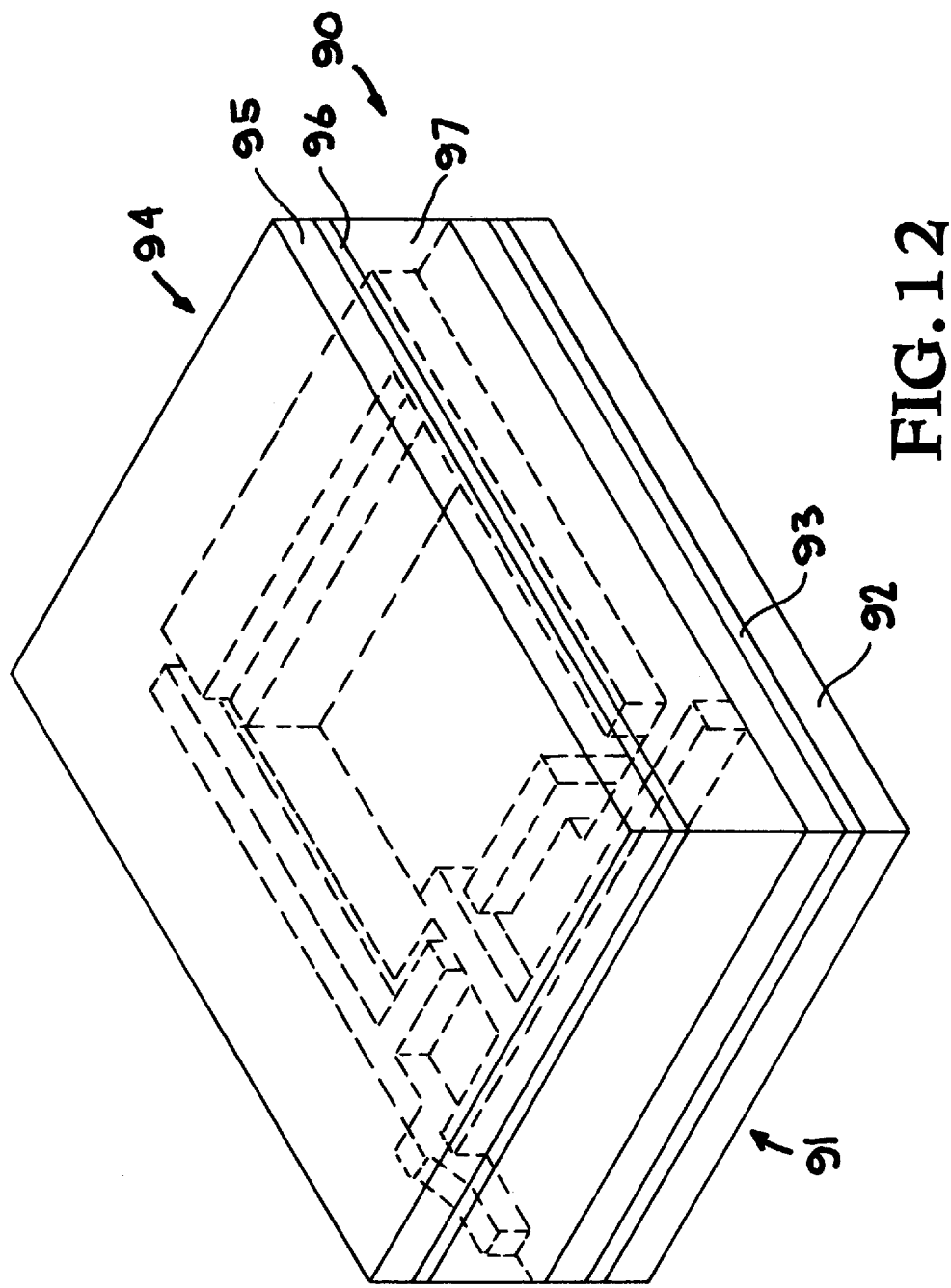
FIG. 12 is a top perspective view of an embodiment of a laminated pixel element similar to FIG. 11 but utilizing the pixel circuit arrangement of FIG. 10.

The assembly of the components of this invention; namely, the active matrix pixel circuit, the NCAP film, and the counter electrode, into a complete pixel element is broadly described as follows. The NCAP film is uniformly coated as a liquid to the ITO/polyester counter electrode and then allowed to dry. This structure is then laminated to the active matrix substrate, and the resulting structures are shown in FIGS. 11 and 12. Because the NCAP film is comprised largely of liquid crystal, it is typically soft and pliable. Lamination can be aided by the exposure of both substrates to elevated temperature (typically <100° C.) during the lamination process. After lamination electrical connection can be made to the display by a common tab-bonding process performed at elevated temperatures.

Referring now to the drawings, FIG. 1 illustrates a schematic top view of a plurality of pixel circuits for use in an active matrix for liquid crystal display application, showing the TFTs, scan lines, and data lines, storage capacitors, and ITO pixel electrodes. As pointed out above, the pixel electrodes can also be made from a reflective metal, such as aluminum, chromium, molybdenum, and titanium. The dimensions of each pixel circuit may be 500 μm by 500 μm with 20 μm scan and data lines, for example. In addition to ITO, the pixel electrode can be made using a coating or film of zinc oxide, aluminum doped zinc oxide or other transparent conductors.

While FIG. 1 schematically illustrates a plurality of pixel circuits, each generally indicated at 10, interconnected by scan and data lines, only one pixel circuit 10 is fully illustrated and contains a thin-film transistor (TFT), generally indicated at 11, in the left bottom corner thereof. TFT 11 includes a drain electrode 12, a gate electrode 13, and a source electrode 14, with the drain electrode 12 connected to a data line 15, the gate electrode 13, connected to a scan line 16, and the source electrode 14 connected to a pixel electrode 17. An optional storage capacitor 18 is located adjacent the pixel electrode 17 and electrically connected to a scan line 16 of an adjacent pixel circuit. The pixel electrode 17 must be electrically isolated from all other components in the pixel circuits 10. For example, the pixel electrode 17 may be composed of a polyethyleneterephthalate (PET) substrate with 700 Å of indium-doped tin oxide (ITO) on the top surface of the substrate. As described in greater detail hereinafter, the ITO of electrode 17 can be pattered either near the beginning of the fabrication sequence, or after the TFT device 11 has been doped and etched, and prior to interconnect metalization. For sake of example, the process is described wherein the ITO is patterned prior to interconnect metalization.

Figure 2:
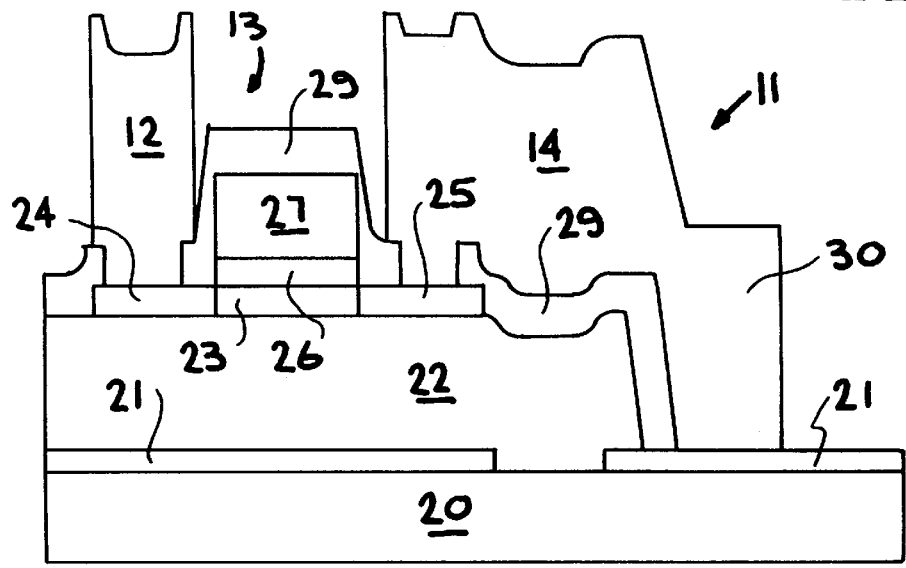
FIG. 2 illustrates in enlarged cross-section a section of an embodiment of a pixel circuit such as illustrated in FIG. 1, showing the TFT contact to the pixel electrode on a plastic substrate.

Prior to a description of the process for producing the laminated structure containing a pixel circuit, the NCAP film, and a counter electrode, thereby forming a pixel element in accordance with the present invention, fabrication processes for the pixel circuit embodiments are set forth to provide a full understanding of how the pixel elements of this invention can be manufactured. The pixel circuit fabrication process, as pointed out above and described and claimed in above-referenced copending application Ser. No. 08/940,104, proceeds primarily from the process of above-referenced copending application Ser. No. 08/611,318 for producing the silicon TFT devices with the addition of two photolithography operations to pattern the pixel electrodes and an optional third photolithography operation to clear the oxide over the ITO pixel electrode. The following sets forth a description of the overall process, with reference to the FIG. 2 embodiment of the pixel circuit:

1. Plastic substrate 20 undergoes extended bake or annealing at a temperature above 100° C. (140°–150° C.) for a time period of 10 minutes to 100 hours to reduce deformation in subsequent process operations. An example of the plastic substrate 20 is the biaxially oriented semicrystalline polyester polyethyleneterephthalate (PET) which has an excellent optical quality and is low cost.

2. Solvent clean plastic substrate using a sequence of solvent or acid rinses, exemplified by:
   a) heated acetone (40°–60° C. for 2–5 minutes),
   b) heated methanol (40°–60° C. for 2–5 minutes),
   c) de-ionized water (DI) rinse and spin dry.

3. A 700 Å thick indium doped tin oxide (ITO) film 21 is deposited on the cleaned substrate 20 by low temperature sputtering. For reflective displays a film of aluminum, for example, is deposited on substrate 20.

4. Plasma enhanced chemical vapor deposition (PECVD) of:
   a) 5000–7500 Å of $SiO_2$ at 100° C. (not shown) on back side of substrate 20,
   b) 5000–7500 Å of $SiO_2$ at 100° C. forming layer 22 on front side of substrate 20,
   c) 1000 Å layer 23 of a-Si at 100° C. on $SiO_2$ layer 22.

5. Laser Crystallization of sections of the a-Si layer:
   a) front side exposure for 5–10 seconds to HF vapor (2:1 HF:DI),
   b) place plastic substrate 20 in a gas cell and pump to a pressure of <100 mTorr,
   c) irradiate the a-Si layer 23 with a pulsed excimer laser (i.e., a XeCl laser with 35 ns FWHM, $\lambda$=308 nm) with between 1 and 100 pulses of energy fluences between 80 and 500 $mJ/cm^2$, to convert all or part of layer 23 to polycrystalline silicon,
   d) remove wafer.

6. PECVD gate electrode deposition:
   a) clean laser crystallized silicon surface with a short (10–60) second dip in an oxide etchant (e.g. 777 etch made by Dodd Chemical). Rinse in deionized $H_2O$,
   b) (optional) expose substrate 20 to $O_2$ plasma for 1–5 minutes at 50–150 mTorr pressure and 50 to 250 watts to cause $O_2$ impingement on the surface,
   c) (optional) expose substrate 20 to $N_2O$ before $SiO_2$ deposition,
   d) deposit layer 26 of 800–2000 Å of $SiO_2$ at 100° C. on center section of a-Si layer 23.

7. Aluminum gate electrode deposition:
   a) deposit layer 27 of 1000 Å–5000 Å of 100% aluminum using either sputtering or e-beam evaporation,
   b) assure substrate 20 not heated above 100°–120° C. during aluminum deposition.

8. Photolithography #1-patterning to form gate 13:
   a) the following steps are performed during each photolithography procedure and are referred to herein as "standard photolithography" steps:
      1) bake substrate 20 at 80°–90° C. for 10 minutes,
      2) expose to hexamethyl disilazane (HMDS) vapor for 1–2 minutes,
      3) apply and spin photoresist to a thickness of 1–2 μm,
      4) bake substrate for 2 minutes,
      5) place substrate in photolithographic aligner system containing the appropriate mask level,
      6) expose substrate to a high intensity Hg lamp for an appropriate length of time,
      7) develop substrate to make the desired pattern in the resist layer,
      8) DI water rinse and dry the substrate,
      9) inspect the resulting resist pattern, rework if necessary.
      10) bake resist at 80°–90° C. for at least 10 minutes.
   b) etch the aluminum layer 27 to form the gate electrode 13.
   c) etch the exposed gate dielectric ($SiO_2$ layer 26).
   d) remove the photoresist with acetone and methanol, and rinse substrate.
   e) for additional description of the "standard photolithography" process steps, see above-referenced copending application Ser. No. 08/611,318, wherein the following process is exemplified:

1) the thus coated plastic substrate is baked at 90° C. for 2 to 10 minutes, for example,
2) 1.4 μm of photoresist is spun on the coated substrate with a wide range (0.5 μm to 2.5 μm) of photoresist film thicknesses being acceptable in this step,
3) the photoresist-coated substrate is pre-baked at 90° C. for 2 minutes,
4) the TFT gate pattern is exposed using a mask aligner,
5) the pattern is developed using a standard resist developer,
6) the photoresist-coated substrate is post-baked at 90° C. for 5 to 60 minutes, with 10 minutes in this example.

The gate pattern is defined using standard wet chemical and/or plasma etching techniques, an example of which follows:

a) The exposed Al film is etched by immersion in E-6 metal etch, manufactured by Dodd Chemical, for 5 minutes or until etching is complete, leaving an area of the film, followed by a deionized water rinse. The etching time will vary with Al gate thickness and etch bath temperature (25° to 60° C.). Other wet chemical etches or dry etching processes may be substituted in this step.

b) The sections of an oxide or insulating layer now exposed by the Al etch is removed by immersion for 30–90 seconds in a well known etchant for etching oxide over contact metal pads, such as 777 etch manufactured by Dodd Chemical, leaving an area. This etching time will vary with the oxide or insulating layer thickness. Other wet chemical etches or dry etching processes may be substituted in this step.

The remaining photoresist is removed using standard solvent and/or photoresist removal chemicals followed by rinse steps.

9. Laser doping to form the TFT source and drain regions 25 and 24:

a) the source and drain regions are doped by a step similar to the laser crystallization step above except that the surface is irradiated in the presence of a doping gas. A gas immersion laser doping (GILD) technique known in the art can be used. Presently $PF_5$ at 200 Torr is used and each region is irradiated with 20–100 laser pulses. Other appropriate doping gases, including $BF_3$, $AsF_5$, $B_2H_6$, and $PH_3$, can be substituted.

b) an alternative method of doping is to deposit a thin layer of the desired dopant using a variety of techniques, followed by laser assisted dopant drive-in. Such a technique is described and claimed in copending U.S. application Ser. No. 08/876,414, filed Jun. 16, 1997, entitled "Deposition Of Dopant Impurities And Pulsed Energy Driven-In", assigned to the same assignee. This alternative method greatly increases the efficiency of the laser doping process by reducing the number of required laser pulses to less than 5 pulses.

10. Photolithography #2-TFT II patterning:
a) perform the above-referenced "Standard Photolithography" steps,
b) plasma etch the silicon layer 23 in an $SF_6$ plasma for 25 seconds at 250 W and 50 mTorr.

11. Photolithography #3-Pixel electrode 17 clearing:
a) perform the "Standard Photolithography" steps,
b) etch the $SiO_2$ layer 22 over the pixel electrode or ITO film 21 using 777 etch for about 5 minutes. The 777 etch contains 7 parts phosphoric acid, 7 parts acetic acid, 7 parts DI, and 1 part ethylene glycol.

c) DI rinse and spin dry.

12. Photolithography #4-pixel electrode 17 isolation:
a) perform the "Standard Photolithography" steps,
b) etch the 700 Å ITO layer 21 to form the individual pixel electrodes 17. Etching may be accomplished using either 777 etch for 4 minutes or 2:1 DI:HCl for 75 seconds,
c) DI rinse and spin dry.

13. PECVD contact isolation:
a) perform adhesion promoting step (expose substrate to $O_2$ plasma for 2 minutes),
b) deposit layer 29 of 1500–3500 Å of $SiO_2$.

14. Photolithography #5-Contact $SiO_2$ clearing:
a) perform Standard Photolithography steps except add 2 minutes $O_2$ plasma exposure prior to resist spinning,
b) etch the $SiO_2$ layer 29 in 777 etch for the appropriate duration.

15. Aluminum interconnect deposition:
a) perform pre-sputter etch to insure contact areas have no $SiO_2$ remaining,
b) sputter a layer 30 of 5000 Å–1 μm of 100% aluminum.

16. Photolithography #6-interconnect aluminum etching:
a) perform "Standard Photolithography" steps,
b) etch the aluminum layer 30 in E-6 metal etch at 40° C. for the appropriate duration.

17. Photolithography #7-pixel electrode contact $SiO_2$ clearing:
a) perform the "Standard Photolithography" steps,
b) etch the contact $SiO_2$ down to the ITO electrode 17. Etching is accomplished using 777 etch for 4 minutes,
c) DI water rinse and spin dry.

The storage capacitor 18 of FIG. 1 may be formed during the above described process, wherein the electrodes of the capacitor are formed by the ITO layer 21 on the bottom and interconnect metal layer 30 on top, with the contact isolation oxide layer (typically 1500 Å to 3500 Å $SiO_2$ also deposited at 100° C.) serving as the dielectric.

Variations of the above-described process include:

1. Other plastic substrate materials (either flexible or rigid) may be used as the substrate material.
2. The plastic polyethyleneteraphthalate substrate can be changed to various other appropriate plastic substrates described above. These substrates can be processed at higher temperatures.
3. The ITO electrode film may be deposited at a later stage in the TFT fabrication process, rather than at the beginning. Opaque, reflecting, or translucent conductors could also be used for the pixel electrode for direct view or projection displays, and may be subsequently processed to enhance the reflective or transmissive optical properties of the pixel.
4. Other gate dielectrics (such as $SiN_x$ or $TiO_2$) can be substituted for the $SiO_2$ dielectric.
5. Patterning of the pixel electrode may be performed at any appropriate step of the process.
6. Other transparent conductors (such as zinc oxide) may be used in place of ITO for the pixel electrode.
7. Reflective displays can be made using aluminum or some other metal as the pixel electrode. This aluminum can be either included in the interconnect metal step or at the end of the process as its own layer. If it is at the end of the process it can be placed over as much as 95% of the total pixel area (including directly over the TFT) to increase the aperture ratio of the pixel.

8. The simple pixel circuit shown in FIG. 1 can be modified by changing the size and location of the TFT, the storage capacitor, and the pixel electrode. Additional TFTs can be added as needed.

9. The layer thicknesses of the embodiment of FIG. 2 and described in the above description can be varied according to the desired electrical performance of the TFT and pixel circuit.

10. The simple pixel electrode and storage capacitor elements applicable for transmissive displays may be replaced with electrodes suitable for providing power to emissive materials, such as semiconductor or organic light emitting diodes (OLED's). In addition to simple electrodes, more complicated circuit elements such as a latch and power bus connection could be used to provide continuous power to light emitting materials.

11. The row and column connections for an array of pixels can be arranged so that the gate electrodes are connected together in columns, and the drain electrodes connected together into rows.

Figure 3:
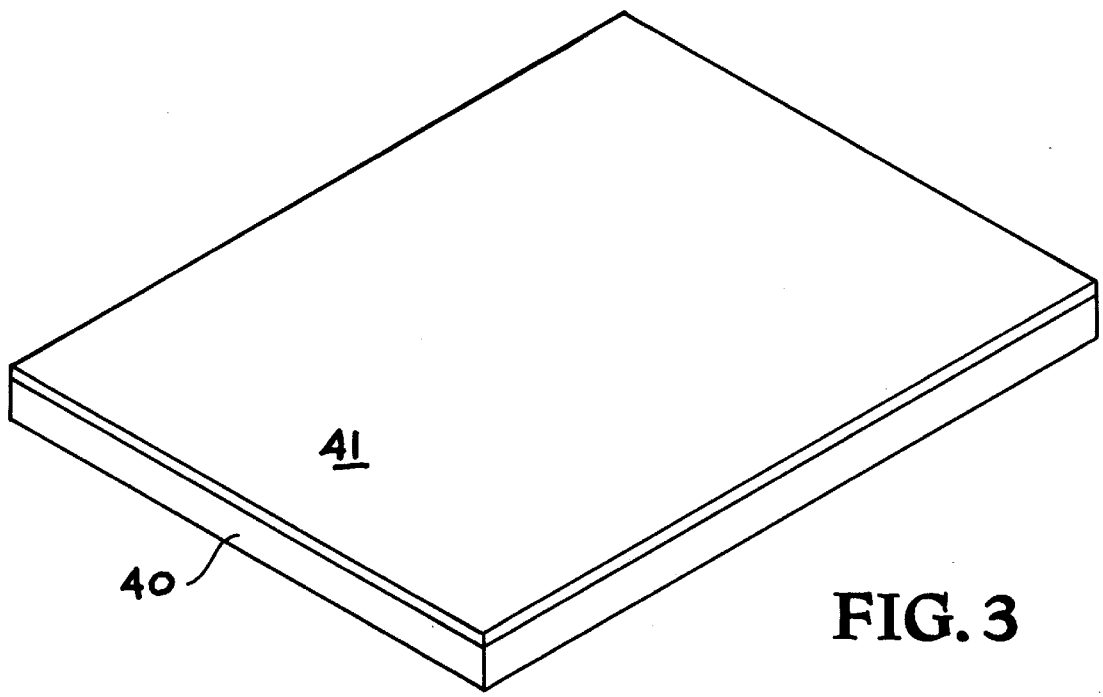
FIGS. 3–9 illustrate the fabrication of another embodiment of a pixel circuit.
Figure 4:
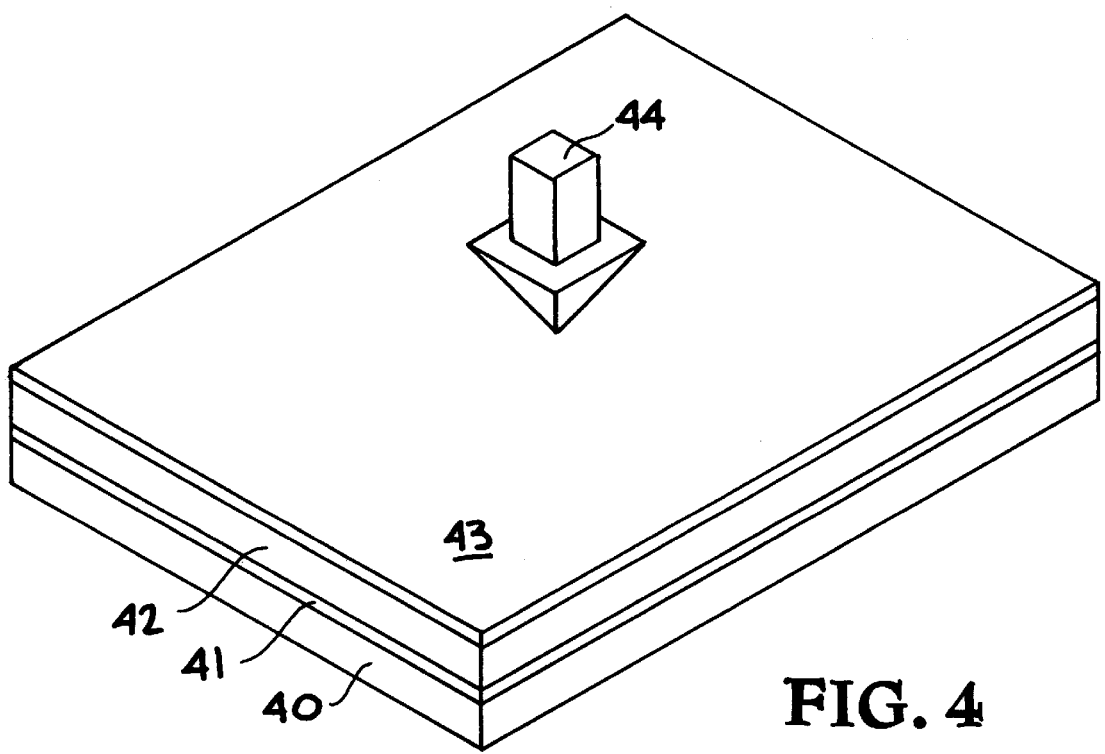
Figure 5:
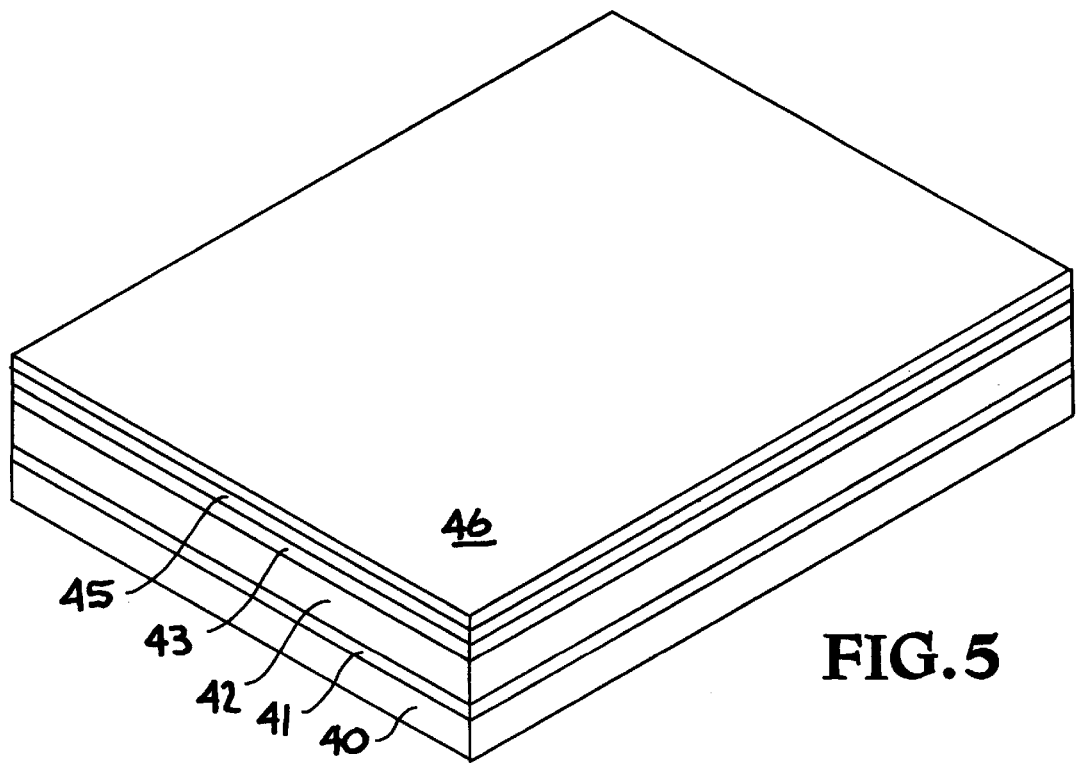
Figure 6:
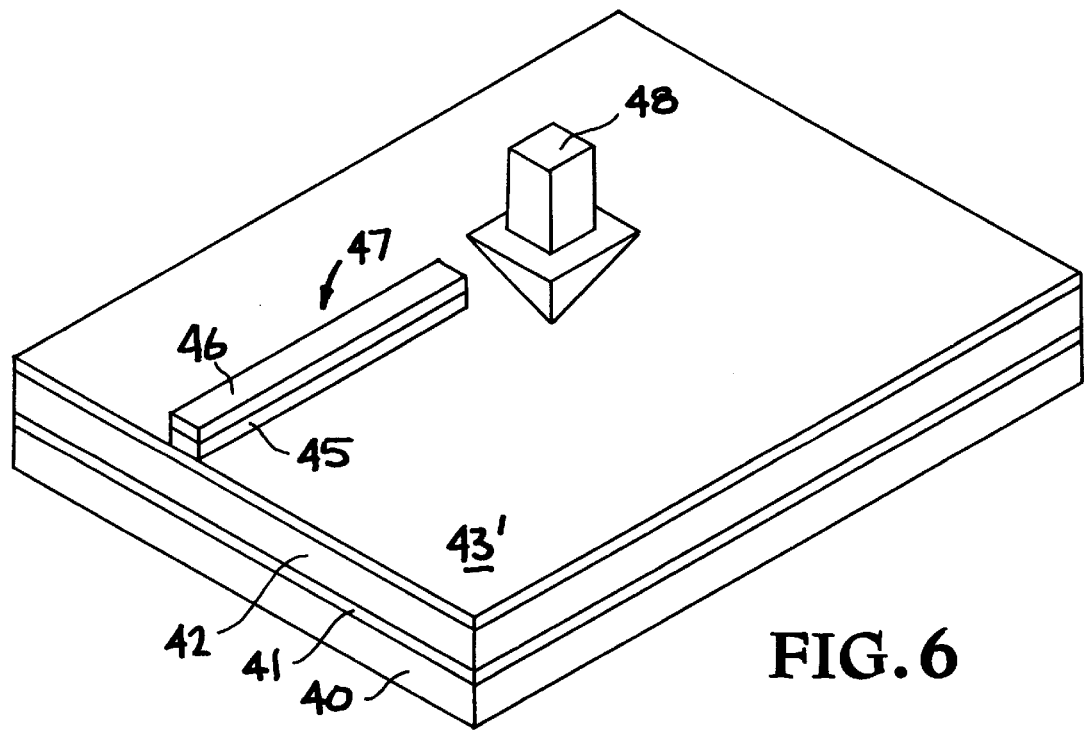
Figure 7:
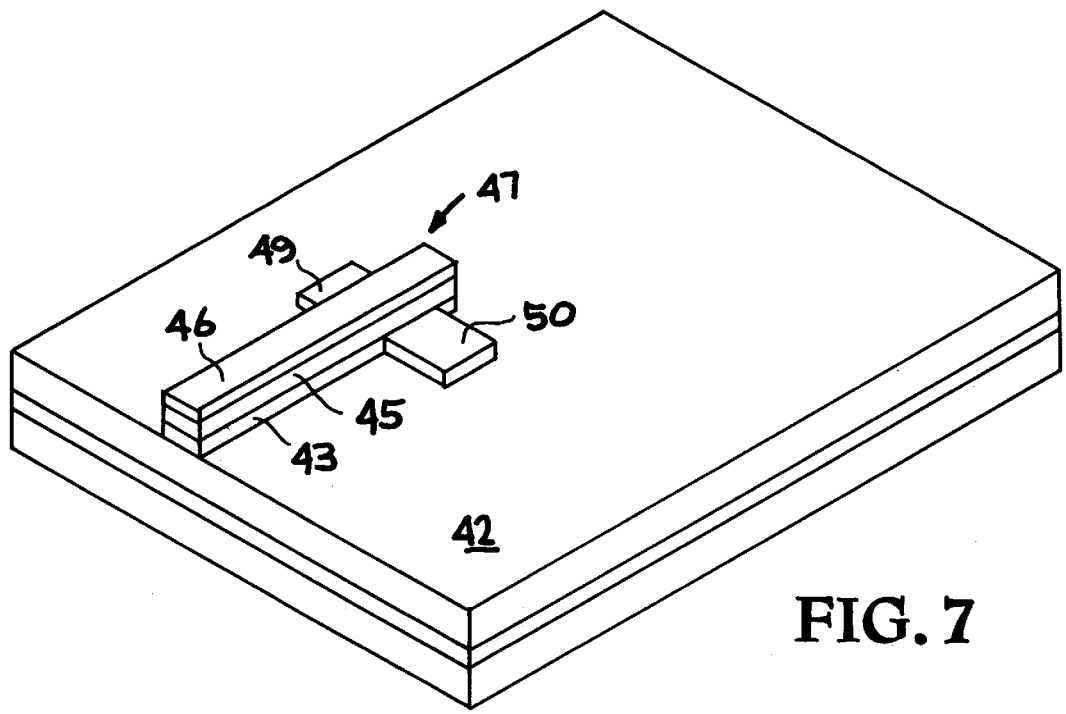
Figure 8:
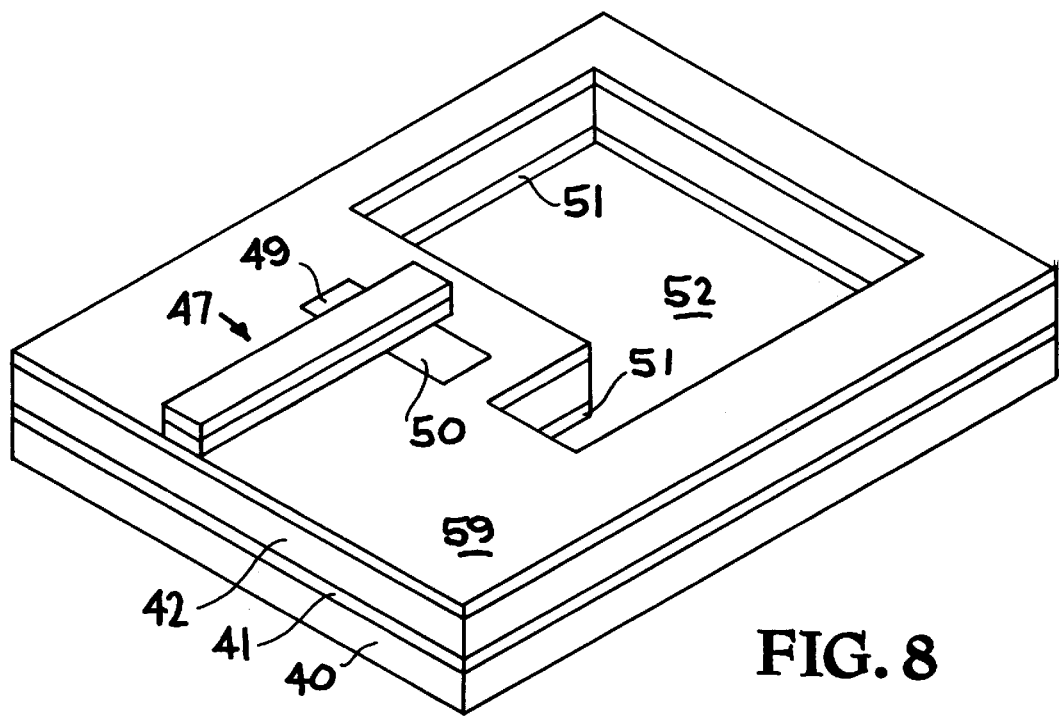
Figure 9:
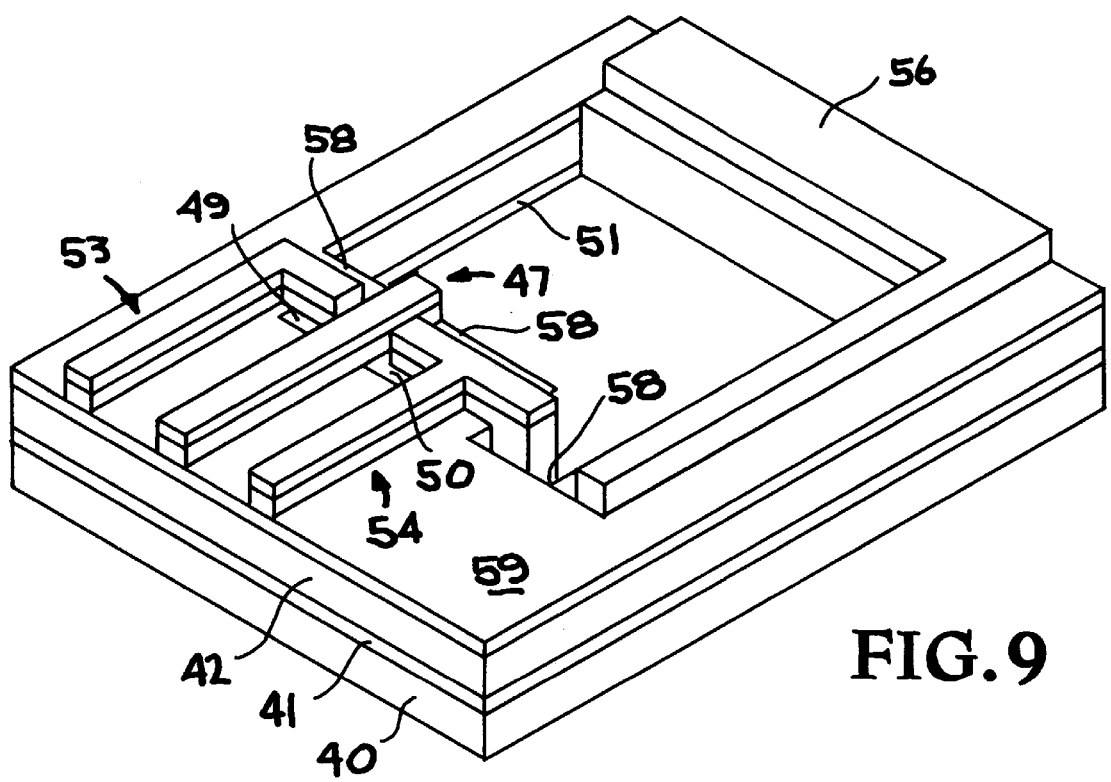

FIGS. 3–9 illustrate the fabrication of another embodiment of the pixel element, with the final product being illustrated by FIG. 9. Broadly, the embodiment of FIG. 9 is fabricated using a starting substrate composed of a layer 40 of plastic (polyester) material on which is deposited a layer 41 of ITO, as shown in FIG. 3. As shown in FIG. 4, a layer 42 of $SiO_2$ is deposited on ITO layer 41 by PECVD and a layer 43 of a-Si:H is deposited on $SiO_2$ layer 42, whereafter the a-Si:H layer 43 undergoes laser crystallization as indicated by energy flow arrows 44, the energy being produced by an XeCl pulsed excimer laser ($\lambda$=308 nm). FIG. 5 illustrates a complete device stack wherein another layer 45 of $SiO_2$ is deposited by PECVD on the crystallized a-Si:H layer 43, and a layer 46 of aluminum is deposited on the $SiO_2$ layer 45. FIG. 6 illustrates gate formation/laser doping of the device stack of FIG. 5, wherein a TFT gate electrode (scan line) 47 is formed by patterning and etching the aluminum layer 46 and the $SiO_2$ layer 45, leaving the layer 43 exposed, and whereafter the layer 43 is irradiated by pulsed energy indicated by energy arrows 48 from an XeCl pulsed excimer laser ($\lambda$=308 nm) in a dopant atmosphere such as $PF_5$, thereby converting the undoped layer 43 to a doped poly-Si layer 43'. TFT patterning is carried out as shown in FIG. 7 wherein the doped poly-Si layer 43' is patterned and etched so as form a TFT drain electrode 49 and a TFT source electrode 50, with the $SiO_2$ layer 42 exposed except in the location of the electrodes 47, 49 and 50. Pixel formation is then carried out as shown in FIG. 8, wherein a section of the $SiO_2$ layer 42 is patterned and etched to expose a section of the ITO layer 41 followed by patterning and etching of an outer periphery 51 of the exposed ITO layer 41 to form an ITO pixel electrode 52, with the pixel electrode 52 being electrically isolated from all other components of the pixel circuit. After formation of electrode 52, the entire surface is covered with a 500–3500 Å thick PECVD $SiO_2$ layer 59 (layer 29 of FIG. 2). The pixel circuit is completed as shown in FIG. 9 wherein contact holes 58 are formed in layer 59. A data line 53 and a source line 54 are deposited on $SiO_2$ layer 59 and in electrical contact with drain electrode 49 and source electrode 50, through contact holes 58 and with source line 54 including a contact 55 in electrical contact with ITO pixel electrode 52. Appropriate patterning of the $SiO_2$ layer 59, the gate (scan line) 47 and the ITO pixel electrode 52 is carried out to enable depositing of the data line 53, source line 54 and contact 55. A storage capacitor 56 is also deposited on $SiO_2$ layer 59 adjacent ITO pixel electrode 52 by appropriate patterning of the layer 59, etc. The end product, a pixel circuit, as shown in FIG. 9, can then be connected to other pixel circuits via the data line, scan line, and source line, as described above.

FIG. 10 illustrates another embodiment of a pixel circuit generally similar to that of FIG. 9, except in the configuration of the scan line, the data line, and the contact between the source and the pixel electrode. As seen in FIG. 10, the pixel circuits each generally indicated at 60 includes a substrate (polyester layer) 61, an ITO conductor layer 62, an insulator layer 63 of $SiO_2$ applied by PECVD, for example, a TFT generally indicated at 64 comprising a drain electrode 65, a gate electrode 66, and a source electrode 67, with the drain electrode 65 connected to a data line 68, the gate electrode 66 connected to a scan line 69, and the source electrode 67 connected to an ITO pixel electrode 70 by a connector 71. The ITO layer of pixel electrode 70 is formed by a section of the ITO layer 62, the $SiO_2$ layer 63 having been removed in the area of the pixel electrode 70 but functioning to electrically isolate the pixel electrode 70 from the other components of the pixel circuit 60. A storage capacitor 72 is located on a $SiO_2$ layer 73 adjacent pixel electrode 70 so as to be isolated from the pixel electrode 70, and is adapted to be connected to a scan line of an adjacent pixel circuit, as seen in FIG. 1.

The present invention combines the silicon thin-film transistor a (SiTFT) on plastic fabrication process with a pixel circuit fabrication process, both developed at the Lawrence Livermore National Laboratory, with nematic curvilinear aligned phase (NCAP) polymeric liquid crystal material, developed at Raychem Corporation, to fabricate pixel elements for lightweight, rugged, and flexible AMLCDs. The TFTs are addressed by external drive electronics either fabricated directly on the same substrate as the pixels, or fabricated on higher temperature substrates (such as silicon wafers) and connected to the AMLCD with flexible interconnects. The pixel electrodes of the pixel circuits can be made from either a transparent conducting material, such as ITO, to make a transmissive display which reflects light off a reflector located in back of the pixel electronics, or from a metal such as aluminum to create a reflective display where the reflector is above the pixel electronics. The use of an active matrix of TFTs on plastic allows the multiplexing limitation of the NCAP materials to be overcome and thus provides a route to flexible, plastic, bright displays with high information content.

FIGS. 11 and 12 illustrate laminated structures made in accordance with the present invention which utilize the pixel circuits of FIGS. 9 and 10, respectively. As seen in FIG. 11, the laminated structure or pixel element, generally indicated at 80 comprises a pixel circuit generally indicated at 81 and a counter electrode composed of a layer 82 of ITO laminated by a layer 83 of NCAP polymeric liquid crystal material and a plastic layer 85. As seen in FIG. 12, the laminated structure or pixel element, generally indicated at 90 comprises a pixel circuit generally indicated at 91, including a layer 92 of plastic (polyester) and a film 93 of ITO, and a counter electrode generally indicated at 94, composed of a layer 95 of plastic (polyester) and a film 96 of ITO, laminated by a layer 97 of NCAP polymeric liquid crystal material. In the FIG. 12 embodiment there are two layers of plastic indicated at 92 and 95, and two films of ITO, indicated at 93 and 96 forming a pixel electrode and a counter electrode, between which is the layer 97 of NCAP.

The assembly of the pixel circuit, the NCAP, and the counter electrode into a laminated structure forming a complete pixel element is carried out, for example, wherein the NCAP is first uniformly coated as a liquid onto the ITO film/polyester layer (FIGS. 11, 12) constituting the counter electrode, and then allowed to dry. This layered structure is laminated to the pixel circuit, and allowed to dry. After lamination electrical connection can be made to the display by a common tab-bonding process performed with a heat-sealing device at elevated temperature. This connection is made remotely from the display area. Because the NCAP is comprised largely of liquid crystal, it is typically soft and pliable. Lamination can be aided by the exposure of both substrates (92 and 95 of FIG. 12) to elevated temperature (typically <100° C.) during the lamination process.

The following is a specific example of the lamination process for the pixel element of FIG. 12.

1. A film of NCAP material was coated on an ITO coated polyester substrate used as the counter electrode. After drying at ambient temperature, the NCAP film thickness was determined to be 10 μm.
2. Both the NCAP coated polyester and the TFT containing polyester were heated on a hot plate for one minute at 65° C.
3. The NCAP coated polyester was then immediately laminated to the TFT substrate through the application of approximately 10 psi pressure for one minute.

In addition to the NCAP layer, color AMLCDs can be made by including a color filter layer in the structure, either at the top or the bottom of the pixel element (i.e., on substrates 92 or 95 in FIG. 12). The location will depend on various design considerations such as whether the pixel electrode is transmissive or reflective, and the type of color filter used.

The laminated pixel element, fabricated as described above, can be arranged into an array of pixels of arbitrary number to form an active matrix display. The array of pixels can be connected such that rows of pixels contain common gate electrodes and columns of pixels contain common drain electrodes. The source electrode of each pixel TFT is connected only to its pixel electrode and is electrically isolated from every other circuit element of the pixel array.

It has thus been shown that the present invention enables the production of bright, polarizer-free, active-matrix liquid crystal displays on plastic substrates. The pixel element can be used in any low cost portable electronics containing flat panel displays wherein ruggedization of the display is desired, and is particularly applicable for uses such as field-deployable portable electronics.

While particular embodiments, sequences of operation, materials, parameters, etc. have been set forth to provide an example and explain the principles of the invention, such are not intended to be limiting. Modifications and changes may become apparent to those skilled in the art, and it is intended that the invention be limited only by the scope of the appended claims.

The invention claimed is:

1. A method for formation of active matrix liquid crystal displays on plastic substrates, comprising:
   providing a pixel circuit containing a transistor on a plastic substrate;
   said substrate being formed of material incapable of withstanding processing temperatures of over about 200° C.;
   providing a counter electrode; and
   joining the pixel circuit and counter electrode using a liquid-crystal material.
2. The method of claim 1, additionally including forming the liquid-crystal material from a nematic curvilinear aligned phase or polymeric liquid crystal material.
3. The method of claim 1, wherein the plastic substrate is selected from a group consisting of PET, PEN, PC, PAR, PEI, PES, PI, Teflon PFA, PEEK, PEK, PETFE, and PMMA.
4. The method of claim 1, wherein the pixel circuit is formed to include a pixel electrode having a conductor selected from a group of materials consisting of transmissive and reflective materials.
5. The method of claim 1, additionally including forming the counter electrode from at least a film of conductive material.
6. The method of claim 1, additionally including forming the counter electrode from a plastic subtrate with a film of conductive material thereon.
7. The method of claim 6, wherein the film of conductive material is composed of indium-doped tin oxide.
8. The method of claim 1, wherein the laminating is carried out by:
   coating the liquid-crystal material on the counter electrode;
   allowing the thus coated material to dry, and laminating the thus coated counter electrode to the pixel circuit.
9. A pixel element, comprising:
   a pixel circuit containing a transistor on a substrate incapable of withstanding processing temperatures of over about 200° C.;
   a counter electrode; and
   an intervening liquid-crystal material.
10. The pixel element of claim 9, wherein said intervening liquid-crystal material is composed of a polymeric liquid-crystal material.
11. The pixel element of claim 10, wherein said polymeric liquid-crystal material is a nematic curvilinear aligned phase material or a polymer dispersed liquid crystal material.
12. The pixel element of claim 9, wherein said substrate consists of a plastic material.
13. The pixel element of claim 9, wherein said counter electrode includes at least a film of transmissive or reflective material.
14. The pixel element of claim 13, wherein said counter electrode additionally includes a substrate.
15. The pixel element of claim 9, wherein said pixel circuit transistor is a silicon TFT.
16. The pixel element of claim 15, wherein said TFT includes a drain electrode connected to a data line, a gate electrode connected to a scan line, and a source electrode connected to a pixel electrode.
17. The pixel element of claim 16, wherein said pixel electrode includes a film of transmissive or reflective material.
18. The pixel element of claim 16, wherein said pixel electrode is mounted on said substrate.
19. The pixel element of claim 9, wherein said pixel circuit includes a storage capacitor.

* * * * *

UNITED STATES PATENT AND TRADEMARK OFFICE
CERTIFICATE OF CORRECTION

PATENT NO. : 5,856,858
DATED : January 5, 1999
INVENTOR(S) : Paul G. Carey, et al.

It is certified that error appears in the above-identified patent and that said Letters Patent is hereby corrected as shown below:

On the title page, item [73]:

Assignee: The Regents of the University of
California, Oakland, Calif. and
RAYCHEM CORPORATION, Menlo
Park, Calif.

Signed and Sealed this

Twenty-ninth Day of August, 2000

Attest:

Q. TODD DICKINSON

*Attesting Officer*      *Director of Patents and Trademarks*